(12) United States Patent
Wastyn et al.

(10) Patent No.: US 10,711,113 B2
(45) Date of Patent: Jul. 14, 2020

(54) POLYSACCHARIDE ADHESIVE

(71) Applicant: AGRANA STÄRKE GMBH, Vienna (AT)

(72) Inventors: Marnik Michel Wastyn, Tulln (AT); Martin Kozich, Tulln (AT); Bernhard Seidl, Tulln (AT)

(73) Assignee: AGRANA STÄRKE GMBH, Vienna (AT)

( * ) Notice: Subject to any disclaimer, the term of this patent is extended or adjusted under 35 U.S.C. 154(b) by 147 days.

(21) Appl. No.: 16/060,848

(22) PCT Filed: Dec. 12, 2016

(86) PCT No.: PCT/EP2016/080650
§ 371 (c)(1),
(2) Date: Jun. 8, 2018

(87) PCT Pub. No.: WO2017/098046
PCT Pub. Date: Jun. 15, 2017

(65) Prior Publication Data
US 2019/0010302 A1    Jan. 10, 2019

(30) Foreign Application Priority Data
Dec. 11, 2015    (EP) .................................... 15199563

(51) Int. Cl.
| | | |
|---|---|---|
| *C08J 9/00* | (2006.01) | |
| *C08J 9/14* | (2006.01) | |
| *C08B 31/00* | (2006.01) | |
| *C09J 103/02* | (2006.01) | |
| *C09J 103/04* | (2006.01) | |
| *C08L 3/04* | (2006.01) | |
| *C08L 3/02* | (2006.01) | |
| *C09J 9/00* | (2006.01) | |
| *D21H 17/28* | (2006.01) | |
| *D21H 19/12* | (2006.01) | |
| *D21H 21/56* | (2006.01) | |

(52) U.S. Cl.
CPC ............. *C08J 9/142* (2013.01); *C08B 31/006* (2013.01); *C08L 3/02* (2013.01); *C08L 3/04* (2013.01); *C09J 9/00* (2013.01); *C09J 103/02* (2013.01); *C09J 103/04* (2013.01); *D21H 17/28* (2013.01); *D21H 19/12* (2013.01); *D21H 21/56* (2013.01); *C08J 2207/02* (2013.01); *C08J 2303/02* (2013.01); *C08J 2303/04* (2013.01)

(58) Field of Classification Search
None
See application file for complete search history.

(56) References Cited

U.S. PATENT DOCUMENTS

| | | | | |
|---|---|---|---|---|
| 2,967,110 A * | 1/1961 | Beersma | ................. | C08B 30/14 106/162.81 |
| 3,284,221 A * | 11/1966 | Huebschmann | ....... | C09J 103/02 106/208.3 |
| 5,490,876 A * | 2/1996 | Warmerdam | ............ | A24C 5/24 106/209.1 |
| 6,280,514 B1 * | 8/2001 | Lydzinski | ................. | C08J 9/125 106/122 |
| 6,280,515 B1 | 8/2001 | Lydzinski et al. | | |
| 6,379,447 B1 | 4/2002 | Eden et al. | | |
| 6,648,955 B1 * | 11/2003 | Swiezkowski | ........... | C09J 11/04 106/210.1 |
| 2005/0045267 A1 | 3/2005 | Muvundamina | | |

FOREIGN PATENT DOCUMENTS

| | | |
|---|---|---|
| EP | 0990687 | 4/2000 |
| GB | 1420392 | 1/1976 |
| WO | WO 02/00804 | 1/2002 |

OTHER PUBLICATIONS

International Preliminary Report on Patentability Issued in Corresponding PCT Application No. PCT/EP2016/080650, dated Nov. 13, 2017.
International Search Report issued in International Patent Application No. PCT/EP2016/080650, dated Feb. 10, 2017.
Wurzburg, O.B., "Modified Starches: Properties and Uses", CRC Press, Inc, 1987, pp. 113-130.

* cited by examiner

*Primary Examiner* — Patricia L. Hailey
*Assistant Examiner* — Stefanie J Cohen
(74) *Attorney, Agent, or Firm* — Norton Rose & Fulbright US LLP

(57) ABSTRACT

The present invention relates to the use of a polysaccharide adhesive containing cold water-soluble or cold water-swelling, covalently cross-linked starch as a binder together with a foam generator for producing an adhesive foam.

13 Claims, No Drawings

POLYSACCHARIDE ADHESIVE

CROSS-REFERENCE TO RELATED APPLICATIONS

This application is a national phase application under 35 U.S.C. § 371 of International Application No. PCT/EP2016/080650 filed 12 Dec. 2016, which claims priority to European Patent Application No. 15199563.6 filed 11 Dec. 2015. The entire contents of each of the abovereferenced disclosures is specifically incorporated by reference herein without disclaimer.

The present invention relates to the bonding of materials consisting of natural fibers, such as paper or paper products, by means of a foamed polysaccharide adhesive on an aqueous basis. Such bonding is required, for instance, in the production of paper sacks, corrugated paperboard and the like. In particular, the present invention relates to the use of cross-linked starch for the preparation of such foamed polysaccharide adhesives on an aqueous basis.

Water based, foamed polysaccharide adhesives are known in the prior art and are used, for instance, in the bonding of corrugated substrates, such as corrugated paperboard. In general, both substrates to be bonded are made of materials consisting of natural fibers, such as paper, cardboard or paperboard.

Furthermore, such foamed polysaccharide adhesives may also be used for the bonding of composite substrates, wherein suitable substrates are planar substrates consisting of fiber materials, in particular of natural fibers. Particularly suitable are, for instance, paperboard, cardboard, and reinforced paper, which may also be reinforced, for instance, with fibers or fabric. In most cases, the substrate has a porous surface and may optionally also be imprinted or coated.

As a second substrate layer, in particular for the preparation of an outer surface, flexible substrates in the form of foils are employed, which may consist of paper, fabric, or plastic foils, wherein composite substrates may also be used. Examples for composite substrates are composites of foil and fabric, laminated paper or multi-layered plastic foils. Particularly suitable as foil substrates are foils made of plastic, for instance made of polyethylene, polypropylene, polyesters, polyvinyl chloride (PVC) or similar materials. Another embodiment, in particular, employs paper foils. The corresponding paper or plastic foils are flexible, panel-shaped materials which may be embossed, imprinted, pigmented, coated, laminated or otherwise treated and may be employed in the form of panels or as preformed sheets. Preferably, said foil-shaped substrates are plastic foils, particularly preferably foils made of polyvinyl chloride (PVC), polyethylene (PE) or polypropylene (PP).

In the finished state, the composite substrates are bonded by means of a dried adhesive layer which had previously been prepared from an aqueous, foamed adhesive dispersion. Upon application, the foamed adhesive will dry and thus form the stable adhesive bond.

Document US 2005/0045267 A1, for instance, discloses paper laminates which are prepared using a foamed, aqueous adhesive. The use of an adhesive in the form of a foam will prevent the aqueous adhesive from soaking through and thus damaging the substrate. The layers to be laminated are, in particular, made of paper, but may also be made of any suitable natural and/or synthetic components. The adhesive may contain polysaccharide, including starch, dextrin, cellulose and the like.

From documents WO 02/00804 A2 and U.S. Pat. No. 6,280,515 B1, a novel method for the preparation of a water-based, foamed polysaccharide adhesive is known, wherein a polysaccharide is combined with water and a foaming agent for the preparation of a foamable adhesive composition which is then treated with the input of energy in order to produce a foam. As suitable polysaccharides or as a basis for modified suitable polysaccharides, starch, dextrin, cellulose, gums or combinations thereof are mentioned. Among the polysaccharides, starch cross-linked with borax (i.e. reversibly cross-linked starch) is also mentioned.

Document EP 0 990 687 A2 discloses an adhesive containing starch cross-linked with epichlorohydrine as well as glyceryl stearate. Foamed adhesives are not mentioned.

Document GB 1 420 392 discloses an adhesive containing cross-linked starch and water. Said composition is cooked using steam. Foamed adhesives are not mentioned.

Document U.S. Pat. No. 6,379,447 B1 discloses an adhesive which is intended for spray-on use and contains cationic starch, tapioca dextrin and cross-linked starch. Foamed adhesives are not mentioned.

The hitherto used foamed polysaccharide adhesives are disadvantageous because they are based on complex formulations, they cannot be processed in a plurality of machines owing to their high viscosity, and an optionally used starch is only cross-linked in a reversible manner, wherein such a reversible cross-linking is mostly accomplished with the use of borax, which is toxic. Moreover, the degree of cross-linking in a starch which has been reversibly cross-linked using, e.g., borax, is strongly pH-dependent. The use of non-cross-linked starch (dextrins) also bears the risk of rheologically unfavorable behavior at the application aggregates.

The problem underlying the present invention is to overcome these disadvantages and to provide an adhesive composition which is easy to prepare, which has a good processability with the use of high-speed machines in a foamed state and in which the degree of cross-linking of the starch employed is pH-independent.

According to the present invention, this problem is solved by using a polysaccharide adhesive comprising cold water-soluble and/or cold water-swellable, covalently cross-linked starch as a binding agent in combination with a foaming agent for the preparation of a foam adhesive. Preferably, the concentration of the cross-linked starch in the polysaccharide adhesive is selected such that an aqueous, unfoamed suspension of the adhesive has a viscosity within a range of about 1000 to 4000 mPa-s, preferably within a range of about 1500 to 2500 mPa-s (Brookfield viscosity, 25° C., 100 rpm). In the present context, a cold water-soluble and/or cold water-swellable, covalently cross-linked starch is a starch which is covalently cross-linked and, at room temperature and in an aqueous solution, alters the viscosity of said solution. In accordance with the present invention, foaming agents are substances which reduce the surface tension of a fluid or the interface tension between two phases and thus enable the formation of dispersions. Such substances are known to the person skilled in the art as surfactants or detergents. Besides covalently cross-linked starch, the starch employed in accordance with the present invention may also be any starch which is reversibly cross-linked.

The polysaccharide adhesive according to the present invention is preferably also combined with degraded starch, which increases the solids content of the aqueous, unfoamed suspension of the adhesive—surprisingly without reducing the adhesive strength of a foam adhesive prepared from such a suspension. According to the present invention it is preferred in this context that not more than 70% by mass of the cross-linked starch be replaced by degraded starch, preferably not more than 60% by mass, particularly preferably not more than 50% by mass. The degraded starch may preferably also be cold water-soluble and/or cold water-swellable, wherein the terms cold water-soluble and cold water-swellable are as defined above.

According to another preferred embodiment of the present invention, the solids content of an aqueous, unfoamed suspension of the adhesive employed according to the present invention should be as high as possible in order to keep the water content in the system to be provided as low as possible during the bonding process. Preferably, the solids content of the aqueous, unfoamed suspension of the adhesive is higher than 15% by mass of the suspension, more preferably higher than 20% by mass, even more preferably higher than 30% by mass, particularly preferably higher than 35% by mass and particularly preferably higher than 40% by mass.

A preferred embodiment of the present invention also relates to the use of the polysaccharide adhesive according to the present invention, wherein an aqueous suspension of the polysaccharide adhesive is foamed. Such an adhesive foam may be prepared using known techniques, for instance by mechanical means such as mechanical stirring or shaking and the introduction of gases, or by chemical means. In this case, air or other gases are mixed into the foamable, aqueous suspension of the polysaccharide adhesive according to the present invention with an additional input of energy in order to generate a stable, homogeneous, foamed adhesive. The use of air is preferred, but other gases such as nitrogen, carbon dioxide, inert gases such as helium and neon may also be employed to generate the foamed adhesive. Preferably, a foaming agent of the brand Hansa (DE) may be used for the preparation of the adhesive foam.

The foam density of the adhesive foam thus prepared preferably is <0.9, <0.8, <0.7, <0.6, <0.5, <0.4 g/mL. The viscosities of the adhesive foams (as measured with a Brookfield viscometer at 100 rpm and 25° C.) are 1000 to 10000 mPa-s, more preferably 1500 to 9000 mPa-s, more preferably 2000 to 8500 mPa-s, and most preferably 2500 to 8000 mPa-s. The adhesive foam prepared in this manner, with an all-over surface application of 60 μm onto a sack paper (80 g/m$^2$), had an adhesive strength of 125 s, preferably <110 s, more preferably <100 s, even more preferably <80 s and most preferably <60 s. The starting material for the cross-linked starch used according to the present invention may be any conventional starch from tubers, cereals or legumes, e.g. pea starch, maize starch, including waxy maize starch, potato starch, amaranth starch, rice starch, including waxy rice starch, wheat starch, including waxy wheat starch, barley starch, including waxy barley starch, tapioca starch, or sago starch.

Starches of natural origin generally have an amylose content of 20% by mass to 30% by mass, depending on the type of plant from which they are obtained. However, there are also amylopectin-rich starches having a significantly increased amylopectin content and products having an increased amylose content. In addition to the amylopectin-rich starch types and high-amylose starch types, of natural origin and/or obtained by means of cultivation, there are also amylopectin-rich starches which are recovered by means of chemical and/or physical fractionation and/or from genetically engineered plants, which are, inter alia, obtained by means of suppressing the production of amylose. Known are amylopectin-rich cereal starches on the basis of maize starch (waxy maize starch), rice starch, wheat starch and barley starch. Novelties in the field of amylopectin-rich starches are represented by amylopectin-rich potato starch and amylopectin-rich tapioca starch.

The cross-linking of such initial starches for the preparation of the cross-linked starches employed according to the present invention is preferably carried out by means of conversion with epichlorohydrine, di- or polyfunctional glycidyl ethers and/or esters (butanediol diglycidyl ether, polyglycerol triglycidyl ether, cyclohexanedimethanol diglycidyl ether, glycerol triglycidyl ether, neopentyl glycol diglycidyl ether, pentaerythritol tetraglycidyl ether, trimethylolpropane triglycidyl ether, perhydrobisphenol diglycidyl ether), phosphorus oxychloride or trimetaphosphate salts (sodium trimetaphosphate). Furthermore, the cross-linking may be carried out, for instance, with adipic acid, polyphosphates, 1,3-dichloro-2-propanol, optionally in a mixture with (poly-)amines, furthermore with di- or polyepoxides, di- or multivalent isocyanates, linear dicarboxylic acid anhydrides, adipic acid, dichloroacetic acid, divinylsulfones, citric acid acrolein, acrolein polyphosphate such as hexametaphosphate, biphenylene, N,N,-dimethylol-imidazolidone (DMEU), via acetal cross-linking, e.g. with formaldehyde, dimethylol ethylene urea aldehydes or aldehyde-releasing reagents such as N,N'-dimethylol-N,N'-ethylene urea and mixed anhydrides of carboxylic acids with di- or tribasic acids, such as a mixed anhydride of acetic anhydride with adipic acid. The latter compound and numerous variants thereof can be summarized under the term "cross-linking with adipic acid". As cross-linking reagents, further cross-linking agents that are known to the person skilled in the art may also be considered; the above-listed reagents merely represent a selection of possible chemicals.

The cross-linking of the initial starches may optionally also be carried out in an extruder by means of reactive extrusion.

Cold water-soluble and/or cold water-swellable, covalently cross-linked starches may be prepared either with or without pre-agglutination, for instance by means of roller drying, spray drying or extrusion. For an optimal development of the properties of the cold water-soluble starches and/or starch derivatives, the degree of lysis is of crucial importance. The higher the degree of lysis of the covalently cross-linked starch employed according to the present invention, the more favorable the properties with respect to, e.g, adhesive strength that are to be expected. According to the present invention, the use of completely lysed cross-linked starches is preferred, i.e. of starches which, for instance, exhibit no or only few polarization crosses under a polarization microscope or in a polarizer or leave only a very small residue, i.e. less than 5% by mass, on a sieve. In this case, the starch product is stirred into water at a corresponding concentration (i.S.) at 1500 rpm for 45 minutes using a toothed-disk stirrer. In order to determine the sieve residue, firstly the empty weight of a stainless-steel sieve (0 about 80 mm, mesh size 250 μm) is measured. The completely admixed glue is then sucked off through the sieve and a rinsing with water is performed until the entire amount of glue has been sucked through the sieve. Then the sieve with the potentially present glue residues is placed onto a glass petri dish and dried in a drying closet at 110° C. for at least 6 hours. The exact amount of residue is then determined by differential weighing. The residue present should not exceed a maximum amount of 5% of the starch employed.

The covalently cross-linked starch employed according to the present invention and/or the derivatives thereof do not exhibit any lump/dust formation or segregation tendency during the lysis process and subsequent use in the polysaccharide adhesive according to the present invention and thus provide optimal processability in practical applications after having been stirred into water.

Further possible chemical modifications of the cross-linked starches and/or cold water-soluble or cold water-swellable cross-linked starches employed according to the present invention are, for instance, etherifications or esterifications. Unless defined otherwise in the following, the substituents comprise organic residues having up to 20, preferably up to 15, in particular up to 10 and specifically up to 6 carbon atoms. In the following, a number of derivatizations are described which may be utilized for further derivatization of the starch derivatives, either alone or in combination. The respective type of derivatization and the basic resources of the starch employed (such as amylopectin-rich potato starch or amylopectin-rich maize starch) are tightly associated with the specific area of application of the respective product. Corresponding methods are known in the art. Specifically mentioned in this context are modifications in slurry and paste; dry derivatizations and modifications using extrusion methods are also possible.

From the literature, a plurality of derivatives are known whose preparation is conveniently summarized, inter alia, in "Starch: Chemistry and Technology", R. L. Whistler, Chapters X and XVII, 1984, and in "Modified Starches: Properties and Uses", edited by O. B. Wurzburg, Chapters 2-6 and 9-11, CRC Press, 1986. In general, starch derivatives are categorized as starch ethers and starch esters. A further distinction is made between nonionic, anionic, cationic, amphoteric and hydrophobic starch derivatives, which may be prepared by means of slurry, paste, semi-dry or dry derivatization as well as by means of derivatization in organic solvents.

The category of anionic and nonionic modifications of starch comprises those derivatives in which the free hydroxyl groups of the starch are substituted by anionic or nonionic groups.

In principle, anionic and nonionic derivatizations may be carried out in two different manners:
  a) The modification is performed in a manner that leads to an esterification of the starch. Inorganic or organic acids with different valences, mostly bivalent, and/or salts thereof and/or esters thereof and/or anhydrides thereof are used as modifying agents. Among others, the following acids (which are listed in an exemplary manner only) are suited for this purpose: o-phosphoric acid, m-phosphoric acid, polyphosphoric acid, a variety of sulfuric acids, different silicic acids, diverse boric acids, acetic acid, oxalic acid, succinic acid and derivatives thereof, glutaric acid, adipic acid, phthalic acid, citric acid and the like. Mixed esters or anhydrides may also be used. The esterification of the starch may be multiple in nature, in order to prepare, for instance, distarch phosphoric acid esters. In this case, the starch employed according to the present invention preferably is the product of an esterification with mono-, di- or tricarboxylic acids having an alkyl chain with 1 to 30 carbon atoms or a carbamate which is particularly preferably acylated, such as succinylated, octenyl succinylated, dodecyl succinylated or acetylated.
  b) The modification is performed in a manner that leads to an etherification of the starch. In this case it is particularly preferred that the starch employed according to the present invention is a methyl-, ethyl-, hydroxyethyl-, hydroxypropyl-, hydroxybutyl-, carboxymethyl-, cyanoethyl-, carbamoylethyl ether starch or a mixture thereof.

The resulting starch is thus, for instance, either primary or additionally substituted with phosphate, phosphonate, sulfate, sulfonate or carboxyl groups. This is achieved, for instance, by means of converting the starch with halogenated carboxylic acids, chlorohydroxyalkyl sulfonates or chlorohydroxyalkyl phosphonates.

The category of cationic modifications of starch comprises those derivatives in which a positive charge is introduced into the starch by means of substitution. The cationization methods are carried out with amino, imino, ammonium, sulfonium or phosphonium groups. Methods for the preparation of of cationized starches have been described, for instance, by D. B. Solareck: Cationic Starches, in the book by O. B. Wurzburg (ed.): Modified Starches: Properties and Uses, CRC Press Inc., Boca Raton, Fla., USA (1986), pp 113-130. Such cationic derivatives preferably contain nitrogen-containing groups, in particular primary, secondary, tertiary and quaternary amine and/or sulfonium and phosphonium groups which are bound via ether or ester bonds. Preferred in this context is the use of cationized starches containing tertiary and electropositively charged quaternary ammonium groups.

Another group is represented by amphoteric starches. These starches contain both anionic and cationic groups, which renders their possible applications highly specific. They are mostly cationic starches which are additionally modified either by phosphate groups, carboxymethyl groups or by xanthates. An overview of the preparation of such products has also been described by D. B. Solareck: Cationic Starches, in the book by O. B. Wurzburg (ed.): Modified Starches: Properties and Uses, CRC Press Inc., Boca Raton, Fla., USA (1986), pp 113-130.

Esters are categorized into mono starch esters and mixed starch esters, wherein the one or more substituent(s) of the ester may be different: in the ester residue RCOO— the residue R may be an alkyl, aryl, alkenyl, alkaryl or aralkyl residue having 1 to 20 carbon atoms, preferably having 1 to 17 carbon atoms, preferably having 1 to 6 carbon atoms. These products include the derivatives acetate (prepared from vinyl acetate or acetane hydride), propionate, butyrate, stearate, phthalate, succinate, oleate, maleinate, fumarate and benzoate.

Etherifications are mostly carried out by means of conversion with alkylene oxides (hydroxyalkylation) containing 1 to 20 carbon atoms, preferably 2 to 6 carbon atoms, in particular 2 to 4 carbon atoms, in particular using ethylene and propylene oxide. However, methyl, carboxymethyl, cyanoethyl and carbamoyl ethers may also be prepared and used. One example of a carboxyalkylation is the reaction of starch with monochloroacetic acid or salts thereof. Furthermore, hydrophobicizing etherification reagents such as glycidyl ethers or epoxides are specifically mentioned. The alkyl chain length of the above reagents is between 1 an 20 carbon atoms; in addition, aromatic glycidyl ethers are also conceivable.

Examples of derivatizations with glycidyl ethers are o-cresol glycidyl ethers, polypropylene diglycol glycidyl ethers, tert-butylphenyl glycidyl ethers, ethylhexyl glycidyl ethers, hexanediol glycidyl ethers and neodecanoic acid glycidyl esters.

Another possible form of alkylation is the alkylation via alkyl halogenides, e.g. methyl chloride, dialkyl carbonate such as dimethyl carbonate (DMC) or dialkyl sulfate such as dimethyl sulfate.

The molar degree of substitution MS (=molar substitution: mol substituent/mol glucose unit) is preferably at least 0.0001, 0.001, 0.01, 0.02, 0.03, 0.04, or at least 0.05, 0.06, 0.07, 0.08, or 0.09, most preferably at least 0.1 and up to 3.0, 2.0, 1.0, 0.8, 0.75, 0.7 or up to 0.6. The degree of substitution DS (=degree of substitution: mol substituent (directly bound to the glucose unit)/mol glucose unit) is preferably between 0.001 and 3.0, preferably between 0.05 and 0.5.

The starches used for the esterifications, etherifications and cross-linkings as well as the chemically unmodified starches may additionally be annealed (in the slurry) or inhibited (dry and/or semi-dry reaction) via thermophysical modifications.

Starches may also be modified using hydrophobizing reagents. Etherified, hydrophobic starches are obtained if the hydrophobic reagents contain a halogenide, an epoxide, a glycidyl, a halogen hydrine, a carboxylic acid or a quaternary ammonium group as a functional group. For esterified hydrophobic starches, the hydrophobic reagent will in most cases contain an anhydride. The above-mentioned reactions may also be performed in the presence of a surfactant. The starch may also be hydrophobized by means of mixing a starch or a starch derivative with fatty acid esters. According to the present invention, the starch derivative is hydrophobized, in particular with a degree of derivatization of the hydrophobization as given above in the context of substitutions, preferably with an MS of 0.01 to 0.1. All the starch modifications mentioned can not only be achieved by the conversion of native starches, but also with the use of degraded forms. The degradation processes may be carried out in a mechanical, thermal, thermochemical or enzymatic manner. Thus, not only structural alterations of the starch are possible, but the starch products can also be rendered cold water-soluble and/or cold water-swellable (e.g. dextrinization and extrusion).

Finally, the starch may also be present in the form of a graft polymer or a graft copolymer such as, for instance, products belonging to the group of polyvinyl alcohols, acrylamides or monomers and/or polymers based on hydrocarbons. In this case, the starch/graft (co)-polymerizate may preferably be present in the form of an emulsion polymerizate.

As already mentioned in the above, the polysaccharide adhesive employed according to the present invention may be mixed with a degraded, preferably a highly degraded starch, as a second starch component, which is preferably cold water-soluble and/or cold water-swellable, in order to increase the solids content. Suitable to this end are oxidatively, acidically and thermomechanically degraded starches, preferably dextrins, maltodextrins and enzymatically modified starches, as well as combinations of the products mentioned. The degraded starch preferably has a high solubility in water, in particular at least 75% by mass, in particular embodiments at least 85% by mass, specifically preferably at least 95% by mass of the starch are water-soluble at 25° C.

Dextrins are (highly) degraded and/or hydrolytically cleaved starch products. In the formation of dextrins, heat and acid treatment will cleave the starch into small polymeric fragments which may optionally repolymerize to form a highly branched polymer of medium size. Depending on the different acid and heat treatments, white dextrins or yellow dextrins will be obtained.

Maltodextrins are formed by the enzymatic degradation of starch using amylases. Depending on the type of amylase, different products will be obtained. Hydrolytic cleavage of the starch into smaller fragments will increase the proportion of reducing ends and thus the DE value. In contrast to starches, dextrins are usually soluble in water. In case of prolonged liquid storage, however, retrogradation can also occur with dextrins, in particular at high concentrations.

The term enzymatically modified starch denotes a starch which has been treated with a branching enzyme and is characterized by a high degree of branching (4 to 12% by mass), a narrow molar mass distribution (PDI=1 to 5) and a low DE value (<1).

The foaming agents employed according to the present invention comprise surface-active substances which are, in particular, selected from the group comprising anionic, cationic, amphoteric or nonionic surfactants and mixtures thereof.

Typical examples of anionic surfactants are soaps, alkylbenzene sulfonates, alkane sulfonates, olefin sulfonates, alkyl ether sulfonates, glycerin ether sulfonates, a-methyl ester sulfonates, sulfo fatty acids, alkyl sulfates, fat alcohol ether sulfates, glycerin ether sulfates, hydroxy-mixed ether sulfates, monoglyceride (ether) sulfates, fatty acid amide (ether) sulfates, mono- and dialkyl sulfosuccinates, sulfotriglycerides, amide soaps, amide ether carboxylic acids and salts thereof, fatty acid isothionates, fatty acid sarcosinates, fatty acid taurides, N-acylamino acids such as acyl lactylates, acyl tartrates, acyl glutamates, acyl aspartates, alkyl oligoglucoside sulfates, protein fatty acid condensates and alkyl (ether) phosphates.

Typical examples of cationic surfactants are quaternary ammonium salts and the quaternized derivatives of polyalkanolamine esters as well as quaternary alkylphosphonium salts.

Examples for amphoteric surfactants are alkyl aminoxides, alkyl betaines, alkyl sulfobetaines (sultaines), amidoalkyl betaines, alkyl glycinates, alkyl carboxyglycinates, alkyl amphoacetates, alkyl amphopropionates, alkyl amphoglycinates, alkyl amidopropyl betaines as well as alkyl amidopropyl- and hydroxysultaines. Particularly preferred amphoteric surfactants are alkyl aminoxides, alkyl sulfobetaines (sultaines), alkyl amphoglycinates alkyl amphoacetates such as sodium coco monoamphoacetates, or sodium coco diamphoacetates and alkyl amidopropyl betaines such as coco amidopropyl betaine.

Specific examples for nonionic surfactants are alkoxylated trimethylolpropane, alkoxylated 1,2,3-trihydroxyhexane, alkoxylated pentaerythritol, alkoxylated sorbitol, alkoxylated glycerin fatty acid esters, alkoxylated trimethylolpropane fatty acid esters, alkoxylated 1,2,3-trihydroxyhexane fatty acid esters, alkoxylated pentaerythritol fatty acid esters, alkoxylated sorbitol fatty acid esters, fatty alcohol polyglycol ethers, alkylphenol polyglycol ethers, fatty acid polyglycol esters, fatty acid amide polyglycol ethers, fatty amine polyglycol ethers, optionally partially oxidized alk(en)yl oligoglycosides and/or glucuronic acid derivatives, fatty acid N-alkyl glucamides, protein hydrolysates, polyol fatty acid esters, sugar esters, alkyl polyglucosides, sorbitan esters, polysorbates and alkanolamides, including alkoxylated alkanolamides and alkyl ether carboxylic acid alkanolamides, as well as block copolymers of propylene oxide with ethylene oxide and mixtures thereof.

The foaming agent employed according to the present invention is preferably used in an amount of 0.05 to 20% by mass and preferably of 0.2 to 5% by mass, based on the aqueous, unfoamed suspension of the adhesive.

The polysaccharide adhesives according to the present inventions may further comprise conventional accessory or filling agents, additives, salts, buffer components or biocides. Such additives or filling agents may, in particular, be used for the fine adjustment of viscosity, solids content, stability, bonding strength, rheology, drying rate and flexibility as well as water and fungus resistance.

a) filling agents: kaolin, silicates, calcium carbonate, chalk, talcum, magnesium carbonate, microsilica, fibers and the like;

b) rheology additives: influence shear thinning and/or shear thickening as well as foam stability: inorganic colloids (sheet silicates, bentonites, montmorillonite, kaolins and the like), associative rheology additives (polyurethanes, polyether polyols, polyacrylates and the like), alkali-swellable acrylates, peptides and proteins, silicates, urea, xanthan gum, casein, alginate, cellulose ethers, carrageen, guar gum, hydrocolloids, sodium silicate (liquid glass) and the like;

c) dispersing agents: polyacrylates, hydrophobized polyacrylates and the like;

d) preservatives (fungicides, biocides, bactericides): BIT, MIT, CIT, sorbates and the like;

e) moisture-regulating products and/or plasticizers: sodium nitrate, urea, sugar, sugar alcohols, glucose, sorbitol, multivalent alcohols (glycols and the like), calcium chloride, zinc chloride and the like;

f) colorants, pigments: titanium dioxide and the like;

g) antistatic additives;

h) tackifiers: acrylate, dextrin, resins and the like;

i) cross-linking agents: boric acid (borax), zirconium salts, sodium aluminates and the like;

j) wetting agents and surfactants;

k) polyvinyl acetate, polyvinyl alcohol, dispersion powder and the like;

l) wet-strength agents: formaldehyde resins, epichlorohydrine resins, polyimines and the like; as well as m) furthermore: liquid glass, waxes, salts, antioxidants, aromatic substances, anti-foaming agents and further additives which are typically used in this context.

Another preferred embodiment of the present invention relates to the use of covalently cross-linked starch as a binding agent in a polysaccharide adhesive, as described in the above, as well as to the use of covalently cross-linked starch as a binding agent in combination with a foaming agent in an adhesive foam.

The present invention will now be defined in more detail by the following Examples, without being limited thereto.

Abbreviations and/or Materials Employed:

VKS: covalently cross-linked, cold-swelling starch
AS: degraded starch

TABLE 1

Description of the starch products used herein

| | |
|---|---|
| VKS 1 | Cross-linked, cold-swelling potato starch (Solvicol GP45+, AVEBE) |
| VKS 2 | Cross-linked, cold-swelling maize starch (Tackidex O36SP, Roquette) |
| VKS 3 | Cross-linked, extruded maize starch, low degree of cross-linking (prepared as described in the following) |
| VKS 4 | Cross-linked extruded maize starch, higher degree of cross-linking (prepared as described in the following) |
| VKS 5 | Cross-linked, extruded potato starch (prepared as described in the following) |
| AS 1 | Maltodextrin DE6 (Agenamalt 20.226, AGRANA) |
| AS 2 | Yellow dextrin (Dextrin 20.921, AGRANA) |
| AS 3 | OSA-modified dextrin (Mira CAP, Tate&Lyle) |

Preparation of Adhesive Foams:

The glues were prepared by shearing the starches into water at defined concentrations by means of a dissolver for 45 min at 1500 rpm. The concentration of the glues was between 15 and 43% by mass. Subsequently, the glues were mixed with 2% by mass of foaming agent (Simulsol SL 826 by Seppic as a nonionic surfactant and/or Hostapur OS by Clariant as an anionic surfactant) and the glues were foamed using a handmixer for 2 minutes at speed 5. Alternatively, the foaming agent was present together with the one or more starches in the form of a premix which was then sheared into the water and subsequently foamed.

Foam density, Brookfield viscosity (up to a maximum of 10000 mPa·s) and adhesive strength (up to a maximum of 180 s) of the foamed adhesives were then determined.

Determination of Viscosity:

The foam prepared according to the above-described method can be used directly for determining the viscosity. The viscosity measurements were performed using a Brookfield-RV viscometer (DVII+ viscometer) at room temperature and a rotational speed of 100 rpm with a spindle No. 4 or 5. The measurements were conducted directly after the preparation of the adhesive foam. The viscosities were only determined up to a maximum measurement value of 10000 mPa·s. The optimum range is between 2500 and 8000 mPa·s.

Determination of Adhesive Strength:

A hand-held film applicator with a layer thickness of 60 µm is placed on the outer surface of a sack paper (SE BL 90 g/m$^2$), loaded with adhesive foam (preparation see supra) and pulled across the paper. Then a second paper strip is put on top of the first, with the inner paper surface facing downward. The paper thus combined is wiped off with the flat hand, once on the upper side and once more in the same manner on the reverse side. The glued paper strip is now slowly pulled apart (manually, giving gentle jerks) until a complete rupture of fibers (over the entire bonding width) is observed. This point in time represents the gluing speed and is expressed in seconds, wherein a mean value from at least 3 measurements is calculated. If no gluing effect could be detected after 180 sec, the measurement was discontinued. A value of <80 s would be a very good result, while the optimum range is represented by adhesive strengths of <60 s.

Determination of Foam Densities:

The exact amount of 20 mL of the foam was filled into a tared measuring cylinder, the weight was noted, and the calculation of foam density in g/mL was performed on that basis. Good foam densities are below 0.6 g/mL (bisection of density).

Preparation of the Covalently Cross-Linked, Cold-Swelling Starches:

14.8 kg of water are provided in a 100 L container and 11.5 kg of starch (Maisita 21.000 or Stärkina 20.000, AGRANA Austria; 10 kg substance) are suspended therein. The slurry is adjusted to pH 11.3 using 2% NaOH (Donau Chemie, Austria). Then the slurry is transferred into a reactor and heated to 35° C. The additions were as follows: 44 g of epichlorohydrine to VKS 3, 88 g of epichlorohydrine (Sigma, Germany) to VKS 4, and 64 g of phosphorus oxychloride (Sigma, Germany) to VKS 5. After a reaction time of 16 hours (VKS 3 and VKS 4) or 1 hour (VKS 5), the slurry is centrifuged, washed with 150 L of water and dried with a spin-flash dryer (Anhydro A/S, Anhydro, Denmark). The dried starch was subsequently extruded with a twin-screw extruder (TSK-30/28D, Theysohn, Germany).

Results:
Experiments Conducted with Covalently Cross-Linked and Degraded Starches:

Table 2 shows the foaming experiments of pure, covalently cross-linked, cold-swelling starches as well as of pure degraded starches. In addition to the standard foaming agent Simulsol SL826, the foaming agent Hostapur OS Liquid was used. The concentrations of the cross-linked starches were selected such that the unfoamed glues had a viscosity within a range of about 1500 to 2500 mPa-s (Brookfield viscosity, 25° C., 100 rpm).

TABLE 2

Analysis results of the adhesive foams

| Starch basis | Foaming agent | Concentration [%] | Viscosity [mPa-s] | Foam density [g/mL] | Adhesive strength [s] |
|---|---|---|---|---|---|
| VKS 1 | Simulsol | 20 | 4200 | 0.4 | 40 |
| VKS 1 | Hostapur | 20 | 7510 | 0.5 | 39 |
| VKS 2 | Simulsol | 27 | 5070 | 0.5 | 45 |
| VKS 3 | Simulsol | 25 | 3690 | 0.4 | 125 |
| VKS 4 | Hostapur | 20 | 1488 | 0.4 | 56 |
| VKS 5 | Simulsol | 17 | 6160 | 0.5 | 64 |
| VKS 5 | Hostapur | 15 | 7420 | 0.6 | 48 |
| AS 1 | Simulsol | 43 | 5840 | 0.4 | >180 |
| AS 2 | Simulsol | 43 | 3410 | 0.3 | >180 |

The foam densities of the adhesive foams were within a range of 0.3 to 0.5 g/mL, which corresponds to a reduction in density of the adhesives by at least 50%. The adhesive strengths of the starches VKS 1, 2 and 5 were very good, while VKS 3 exhibited a still acceptable adhesive strength in the foamed state; the degraded starches AS 1 and AS 2 exhibited no adhesive strength at all.

Experiments with the Mixtures VKS and AS:

In order to keep the water content in the system as low as possible, the solids content of the glues should be kept as high as possible. This can be achieved by the addition of degraded starch. Table 3 shows the mixtures of the cross-linked starch VKS 3 with the degraded starch AS 1. The viscosity increased with the amount of cross-linked starch and was no longer measurable with an addition of 60% by mass and more of cross-linked starch. The densities of the adhesives could be significantly reduced by means of foaming; good adhesive strengths were obtained with additions of 40% by mass and more of VKS 5. Good foam densities and adhesive strengths could also be achieved with the foaming agent Hostapur. In case of addition of the roasted dextrin AS 2, the foam exhibited a slightly increased viscosity and a slightly slower tackiness (cf. Table 4).

TABLE 3

Results for the adhesive foams with mixtures of VKS 5 and AS 1 at a solids content of 35% by mass

| VKS 5 [%] | Foaming agent | Viscosity [mPa-s] | Foam density [g/mL] | Adhesive strength [s] |
|---|---|---|---|---|
| 10 | Simulsol | 2332 | 0.4 | >180 |
| 20 | Simulsol | 2848 | 0.5 | >180 |
| 30 | Simulsol | 3790 | 0.5 | >180 |
| 40 | Simulsol | 6120 | 0.4 | 50 |
| 50 | Simulsol | 6920 | 0.4 | 47 |
| 60 | Simulsol | >10000 | 0.5 | 35 |
| 30 | Hostapur | 3480 | 0.6 | 52 |
| 40 | Hostapur | 4840 | 0.4 | 36 |

TABLE 4

Results for the adhesive foams with mixtures of VKS 5 and AS 2 at a solids content of 35% by mass

| VKS 5 [%] | Foaming agent | Viscosity [mPa-s] | Foam density [g/mL] | Adhesive strength [s] |
|---|---|---|---|---|
| 50 | Hostapur | 7800 | 0.6 | 80 |

Similar results were obtained with the mixtures of the cross-linked starch VKS 4 and AS 1. The addition of 30% by mass and more of the cross-linked, extruded starch VKS 4 resulted in good viscosities and adhesive strengths at a solids content of 35% by mass. The adhesive foams also exhibited good properties with the use of the foaming agent Hostapur.

TABLE 5

Results for the adhesive foams with mixtures of VKS 4 and AS 1 at a solids content of 35% by mass

| VKS 4 [%] | Foaming agent | Viscosity [mPa-s] | Foam density [g/mL] | Adhesive strength [s] |
|---|---|---|---|---|
| 10 | Simulsol | 3476 | 0.3 | >180 |
| 20 | Simulsol | 2300 | 0.3 | >180 |
| 30 | Simulsol | 1600 | 0.5 | 68 |
| 40 | Simulsol | 2756 | 0.5 | 66 |
| 50 | Simulsol | 3145 | 0.6 | 64 |
| 60 | Simulsol | 6460 | 0.6 | 73 |
| 40 | Hostapur | 2000 | 0.5 | 52 |
| 50 | Hostapur | 2960 | 0.5 | 51 |

TABLE 6

Results for the adhesive foams with mixtures of VKS 4 and AS 1 at a solids content of 43% by mass

| VKS 4 [%] | Foaming agent | Viscosity [mPa-s] | Foam density [g/mL] | Adhesive strength [s] |
|---|---|---|---|---|
| 10 | Simulsol | 2580 | 0.6 | 39 |
| 20 | Simulsol | 2136 | 0.6 | 57 |
| 30 | Simulsol | 2256 | 0.5 | 47 |
| 40 | Simulsol | 4000 | 0.8 | 39 |
| 50 | Simulsol | 8840 | 0.9 | 49 |
| 60 | Simulsol | >1000 | 1.0 | 45 |

In order to further increase the concentration of the glues, the use of another cross-linked starch, i.e. VKS 3, was required. As shown in Table 7, concentrations of 43% by mass could be realized. With proportions of 30% by mass or more of cross-linked starch, the mixtures of VKS 3 and AS 1 exhibited significantly improved adhesive strengths and good foam viscosities.

TABLE 7

Results for the adhesive foams with mixtures of VKS 3 and AS 1 at a solids content of 43% by mass

| VKS 3 [%] | Foaming agent | Viscosity [mPa-s] | Foam density [g/mL] | Adhesive strength [s] |
|---|---|---|---|---|
| 10 | Simulsol | 5230 | 0.5 | >180 |
| 20 | Simulsol | 5480 | 0.4 | >180 |
| 30 | Simulsol | 5750 | 0.5 | 32 |
| 40 | Simulsol | 6380 | 0.5 | 31 |
| 50 | Simulsol | 7350 | 0.4 | 39 |
| 60 | Simulsol | 9530 | 0.5 | 42 |

TABLE 7-continued

Results for the adhesive foams with mixtures of
VKS 3 and AS 1 at a solids content of 43% by mass

| VKS 3 [%] | Foaming agent | Viscosity [mPa-s] | Foam density [g/mL] | Adhesive strength [s] |
|---|---|---|---|---|
| 20 | Hostapur | 2540 | 0.6 | 35 |
| 40 | Hostapur | 1364 | 0.7 | 42 |
| 60 | Hostapur | 7670 | 0.9 | 29 |

Table 8 shows the results of experiments with various further surfactants as foaming agents. The experiments show that a broad spectrum of surfactants is suitable as foaming agents in the adhesive foams.

TABLE 8

Results for the adhesive foams with mixtures of
VKS 3 and AS 1 with different foaming agents

| Foaming agent | Manufacturer | Conc. [%] | Viscosity [mPa-s] | Foam density [g/mL] | Adh. strength [s] |
|---|---|---|---|---|---|
| Genapol LRO | Clariant | 43 | 4750 | 0.55 | 41 |
| Oxidet DM4 | KAO Chemical | 43 | 6000 | 0.34 | 40 |
| Daclor 27-20-23 | Sasol | 43 | 7800 | 0.56 | 80 |
| Polystep B19 | Stepan | 43 | 7810 | 0.77 | 39 |
| TEGO Betain F50 | Evonic | 43 | 7400 | 0.34 | 39 |
| Dowfax 2A1 | DOW | 43 | 6600 | 0.58 | 50 |
| Stokal STA | Bozzetto | 40 | 3660 | 0.75 | 49 |
| Orpil BE | Orpil | 40 | 3712 | 0.54 | 45 |
| Hydriosul Betain | Hydrior | 40 | 3840 | 0.61 | 36 |
| Betadet HR | KAO Chemical | 40 | 3312 | 0.62 | 40 |

COMPARATIVE EXPERIMENTS

Adhesive foams on the basis of roasted dextrins have already been described in WO 2002/00804 and in the U.S. Pat. No. 6,280,514 B1 and U.S. Pat. No. 6,280,515 B1. Table 8 shows the properties of these adhesive foams. The mixtures A and C disclosed in U.S. Pat. No. 6,280,514 B1 exhibited foams having a significantly increased viscosity which are not processable in practice. Moreover, mixture A could not be adequately foamed. Furthermore, the mixtures contain borax, which has been categorized as toxic and merely provides a reversible cross-linking of the starch and/or starch products employed. While omitting borax from the formulation will yield lower viscosities, it does not provide any bonding effect.

The mixtures A to C disclosed in U.S. Pat. No. 6,280,515 B1 did not exhibit sufficient adhesive strengths; moreover, both mixture A and mixture C could not be foamed.

TABLE 9

Results of comparative experiments

| | Glue | Starch basis | Conc. [%] | Visc. [mPa-s] | Foam density [g/mL] | Adh. strength [s] |
|---|---|---|---|---|---|---|
| WO 02/00804 | A | AS 2 | 63 | >10000 | 1.0 | 59 |
| WO 02/00804 | C | AS 3 | 63 | >10000 | 0.6 | 45 |
| WO 02/00804 | A* | AS 2 | 61 | 2300 | 0.9 | >180 |
| WO 02/00804 | C* | AS 3 | 55 | 1440 | 0.5 | >180 |
| WO 02/00804 | A | AS 2 | 33 | 78 | 1.0 | >180 |
| U.S. Pat. No. 6,280,514 B1 | B | AS 3 | 33 | 1400 | 0.3 | >180 |
| U.S. Pat. No. 6,280,514 B1 | C | AS 2/AS 3 | 33 | 173 | 1.0 | >180 |

*formulation without borax

The invention claimed is:

1. A method comprising:
   obtaining a polysaccharide adhesive comprising cold water-soluble and/or cold water-swellable, completely lysed, covalently cross-linked starch as a binding agent in combination with a foaming agent further defined as comprising at least one anionic, cationic, amphoteric, or nonionic surfactant; and
   using the polysaccharide adhesive to prepare an adhesive foam.

2. The method of claim 1, further comprising selecting a concentration of the covalently cross-linked starch in the polysaccharide adhesive such that an aqueous, unfoamed suspension of the adhesive has a viscosity within a range of about 1000 to 4000 mPa-s (Brookfield viscosity, 25° C., 100 rpm).

3. The method of claim 2, wherein the concentration of the covalently cross-linked starch in the polysaccharide adhesive is selected such that the aqueous, unfoamed suspension of the adhesive has a viscosity within a range of about 1500 to 2500 mPa-s.

4. The method of claim 1, wherein not more than 70% by mass of the cross-linked starch is substituted by degraded starch.

5. The method of claim 4, wherein not more than 60% by mass of the cross-linked starch is substituted by degraded starch.

6. The method of claim 5, wherein not more than 50% by mass of the cross-linked starch is substituted by degraded starch.

7. The method of claim 4, wherein the degraded starch comprises at least one dextrin, maltodextrin, or enzymatically modified starch.

8. The method of claim 1, wherein the polysaccharide adhesive is comprised in an aqueous, unfoamed suspension that has a solids content of more than 15% by mass of the suspension.

9. The method of claim 8, wherein the aqueous, unfoamed suspension containing the polysaccharide adhesive has a solids content of more than 20% by mass of the suspension.

10. The method of claim 9, wherein the aqueous, unfoamed suspension containing the polysaccharide adhesive has a solids content of more than 30% by mass of the suspension.

11. The method of claim 10, wherein the aqueous, unfoamed suspension containing the polysaccharide adhesive has a solids content of more than 35% by mass of the suspension.

12. The method of claim 11, wherein the aqueous, unfoamed suspension containing the polysaccharide adhesive has a solids content of more than 40% by mass of the suspension.

13. The method of claim 1, further comprising foaming an aqueous suspension of the polysaccharide adhesive.

\* \* \* \* \*